UNITED STATES PATENT OFFICE.

C. F. SCHÖNBEIN, OF BASLE, SWITZERLAND, ASSIGNOR TO WM. H. ROBERTSON.

IMPROVEMENT IN PREPARATION OF COTTON-WOOL AND OTHER SUBSTANCES AS SUBSTITUTES FOR GUNPOWDER.

Specification forming part of Letters Patent No. 4,874, dated December 5, 1846.

*To all whom it may ncern:*

Be it known that I CHRISTIAN FREDERICK SCHÖNBEIN, the undersigned, of Basle, in Switzerland, have discovered a new Process for Preparing Cotton and other Vegetable Fibrous Substances as a Substitute for Gunpowder, of which the following is a full and exact description, reserving to myself the right of adding thereto such other materials of an explosive nature as I may hereinafter add.

What I claim as my discovery and ask a patent for is—

Treating vegetable fibrous substances and other organic matters being of a chemical composition analogous to that of the said vegetable fibrous substances with a mixture of nitric acid of 1.5 specific gravity, or thereabout, and sulphuric acid of 1.85 specific gravity, or thereabout, at the common temperature, or a lower one, by which compounds are formed which on being heated more or less ignite suddenly and produce gaseous matters. Of all the vegetable substances known to me, cotton-wool is the most fit material for producing an explosive compound answering the purposes of gunpowder, and I therefore claim the use of cotton-wool for this purpose when prepared as herein directed.

To produce that explosive compound the following process is to be gone through.

First. Clean cotton is immersed in a mixture containing the nitric and sulphuric acids of the specific gravities before mentioned. As to the ratio of volumes in which the two acids are to be mixed, it may vary to a considerable extent, and the specific gravity may vary also; but the above is preferable. The ratio, however, yielding the best results is that of one volume of nitric acid to two or three of sulphuric acids.

Second. Into a mixture of the acids of the last-named description clean cotton is plunged in such a manner as to be entirely covered and impregnated by the said acid mixture. Care must be taken that the temperature of the said acid mixture be not above 50° or 60° Fahrenheit.

Third. The cotton, after having remained for an hour or two (more or less) in contact with the acid mixture, must be subject to pressure in order to remove as much as possible from the cotton the acid particles. That being done, the pressed cotton is to be washed as long until the acid is entirely removed. That operation being finished, the prepared cotton is to be dried in moderately-heated rooms. Before using the dry cotton it is important to card it.

Fourth. Cotton-wool acquires also a high inflammability and explosive power by exposing that material at the common temperature to the action of pure nitric acid of the greatest specific gravity that acids can be prepared. This way of rendering the cotton inflammable appears to be less easy and economical than the method above described; but the use of this cotton-wool so prepared I claim as part of my discovery.

Fifth. For many purposes it is good to impregnate the explosive cotton by some nitrate of potash. This prepration imparts to the cotton the property of disengaging a more intense light than the pure prepared cotton does, and the use of nitrate potassa or other known chemical substitutes I claim in combination with the acid treatment.

In testimony whereof I, the said CHRISTIAN FREDERICK SCHÖNBEIN, herewith subscribe my name in the presence of the consul of the United States of America.

CHRISTIAN FREDERICK SCHÖNBEIN.

Witnesses:
JAMES M. CURLEY,
JOSEPH MARQUETTE,
*Clerks in the Consulate of the U. S., London.*